Dec. 20, 1966  G. HELD  3,293,102
TYRE-BUILDING UP DRUM
Filed Nov. 18, 1965  2 Sheets-Sheet 1

Inventor
Gerhard Held

By
Watson, Cole, Grindle+Watson
Attys.

Dec. 20, 1966   G. HELD   3,293,102
TYRE-BUILDING UP DRUM
Filed Nov. 18, 1965   2 Sheets-Sheet 2
Fig. 3
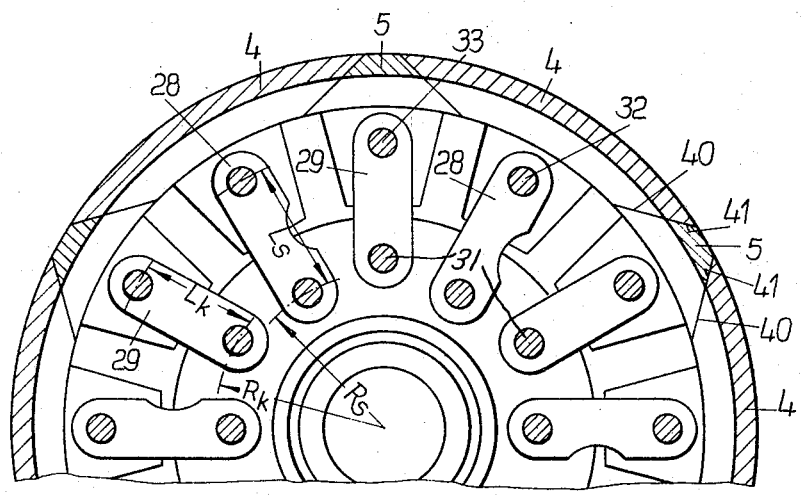
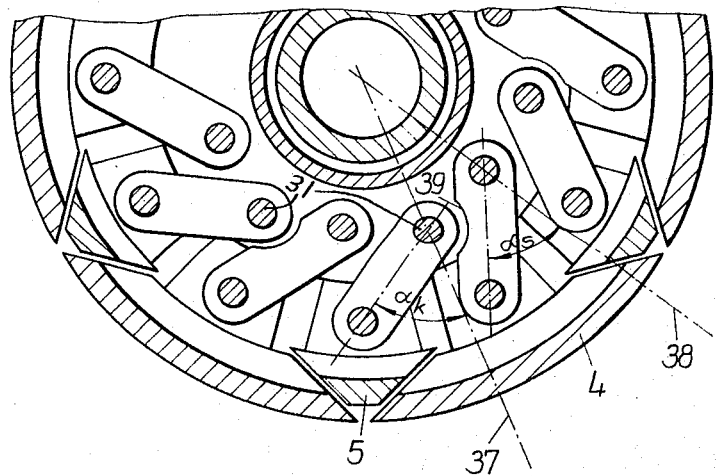
Fig. 4
Inventor
Gerhard Held
By
Watson, Cole, Grindle & Watson
Attys.

3,293,102
TYRE-BUILDING UP DRUM

Gerhard Held, Frankfurt am Main, Germany, assignor to Leonh. Herbert Maschinenfabrik, Bergen-Enkheim, Germany
Filed Nov. 18, 1965, Ser. No. 508,490
Claims priority, application Germany, Nov. 24, 1964, H 54,379
3 Claims. (Cl. 156—420)

The invention relates to tyre building-up drums and more particularly to such drums having radially displaceable segments separated circumferentially by radially displaceable wedge-shaped bars, the segments and bars having inclined faces interengaging in their extended position to close the gaps present between the segments.

In known tyre building-up drums, friction faces are combined with the wedging bars and segments, which co-operate with friction faces displaceable longitudinally relative to the drum. The time interval between the displacement of the wedging bars and the segments is established by causing the friction faces associated with the segments to reach the friction faces co-ordinated with them earlier than the friction faces associated with the bars. Withdrawal of the wedging bars from the segments is effected by tubular springs which tend to urge the friction faces apart.

In such constructions the tubular springs are subject to fatigue so that they cease effectively to return the wedging bars relative to the segments. Considerable frictional forces occur on the friction faces, which result in great wear of these surfaces. The risk of wear is particularly great, since the application of lubricants is undesirable in view of the fabrics to be wound on the drum.

The main object of the present invention is to provide a tyre building-up drum in which these disadvantages are minimised or eliminated.

According to the present invention, a tyre building-up drum comprises a number of radially displaceable segments having circumferentially inclined surfaces, a number of radially displaceable wedge-shaped bars having circumferentially inclined surfaces complementary to said segment surfaces and engaging therewith when the segments and bars are radially outwardly displaced substantially to complete the circumferential contour of the drum, a setting element displaceable with respect to the segments, and a plurality of links each at its inner end portion articulated to the setting element and at its outer end portion articulated to one of the segments or bars and movable from a retracted or non-radial position to an extended radial position, the effective link of the bar links being shorter than that of the segment links when in the substantially radial position, the arrangement being such that when the setting element is operated to move said links the segments will move outwardly before the bars and inwardly after the bars.

Friction faces are wholly omitted in the setting device of the invention. Hinge bolts, which may be produced simply and cheaply, are employed exclusively. The return displacement to the retracted position also occurs in positive manner, and not by springs, thus assuring completely reliable operation of the building-up drum. The displacement is performed by a single setting element, so that entraining and control mechanisms need merely be incorporated for the displacement of this one element, thus providing reliable operation as well as a simple and thus inexpensive form of construction.

In one preferred construction the setting ring comprises a ring or a number of rigidly interconnected rings mounted on a sleeve supported on a shaft coaxial with the drum and movable with respect to said drum, and the links are disposed at right angles to the axis of the shaft and drum. During rotation of the setting element, the links are brought into at least substantially radial directions, their external hinging points thereby being displaced outwards radially, and outwardly entraining the segments and bars articulated to them. This displacement must set in because the segments and wedging bars are displaceable only in the radial direction and cannot yield in the peripheral direction of the drum.

The hinging point of each segment link on the setting ring or rings is advantageously situated closer to the longitudinal axis of the drum than the setting ring hinging point of each wedging bar link. This causes the desired displacement characteristic, i.e. owing to the shorter length of the wedging bar links, their oblique position varies more rapidly than that of the segment links during rotation of the setting ring or rings, so that the inward radial displacement of the wedging bars is faster than the inward displacement of the segments.

The desired displacement may be assisted, by arranging the segment links to subtend a greater angle with the radial direction in the idle position, than the wedging bar links due to the wedging bar links being shorter than the segment links and all the links extending radially in the fully extended position.

In order that the present invention may be more fully understood an embodiment in accordance therewith will now be described by way of example with reference to the accompanying drawings, in which:

FIG. 3 is a partial cross section along the line III—III of FIG. 1 looking in the direction of the arrows; and, FIG. 4 is a partial cross section similar to FIG. 3, in which the segments and wedging bars are shown in their retracted or idle position with the parts of FIG. 4 rotated a small distance as to angular position of the parts as compared to FIG. 3.

Figures 1, 2:
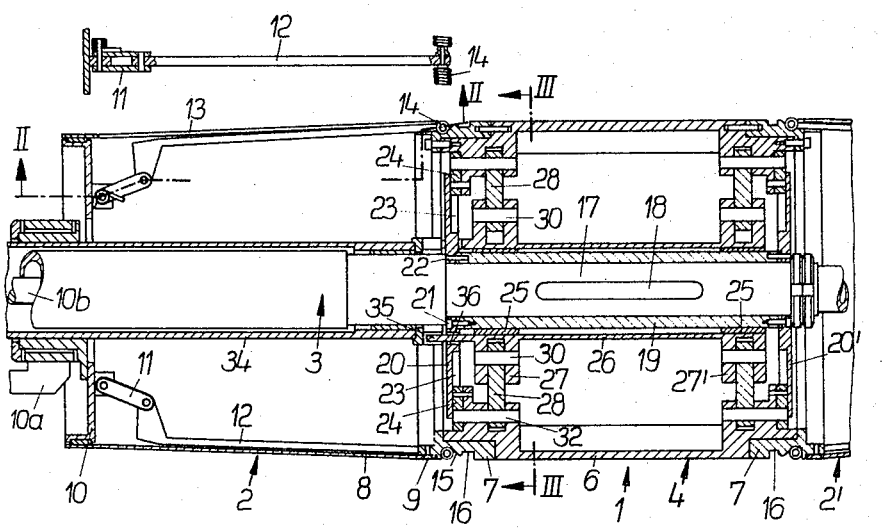
FIG. 1 is a diametrical longitudinal cross section through a drum for building-up tyres, part of the lateral drum at the right-hand side being omitted.
FIG. 2 is a cross section along the line II—II of FIG. 1 looking in the direction of the arrows.

The building-up drum comprises a central drum 1 and side drums 2, 2'. The central drum is firmly coupled to a shaft 3. As shown in FIGS. 3 and 4, the central drum comprises segments 4 and wedging bars 5 between and engaging with them. The segments 4, which consist of several parts in the drawings i.e. the central part 6 and side parts 7, are extended by sheet-metal lateral segments 8 secured to the side parts 7 by countersunk screws 9.

A plate 10 is displaceable along the shaft 3 and thrust elements 12 are secured to the plate 10 by shackles 11, so as to pass through slots 13 in the segments 8. The extremities of the thrust elements 12 have springs 14 secured to them, (FIG. 2), which connect the extremities of the thrust elements 12. This forms a ring of springs lying in a groove 15, the groove 15 in its turn consisting of several part sections; each part section is formed in one of the side parts 7 of the central segments 4.

The operation of this tyre building-up drum is as follows: the central segments 4 are initially displaced inwards radially in a manner to be described. The web of fabric which is to form the tyre carcass, is then wound on to the drum. It has a width covering the central and side drums. Thereafter the bead rings, being wire rings intended to be embedded in the tyre, are pushed over the reeled web, up to the grooves 16 in the parts 7. The central drum is then displaced to the position shown in FIG. 3 whereby its outer surface becomes continuous, and the bead rings press the fabric into the grooves 16. The plates 10 are then forced inwardly, the thrust elements 12 being thus displaced in the direction of the central drum. The plate 10 at the left-hand side of FIG. 1 is displaced by the pushrod 10a and the plate 10 at the right-hand side of FIG. 1 (not shown) is displaced by the shaft 10b, causing the springs 14 to lift the part of the fabric lying on the lateral drums 2, 2′ over the part lying on the central drum 1 and cover the bead rings in the grooves 16. The displacements of the plates 10 on the right and left sides of the central drum are effected in slightly staggered time relationship so that the folded-over fabric portions overlay one over the other. Thereafter the tread surface of the tyre is applied to the fabric, and the tyre is subsequently drawn off the winding drum and passed to further processing stages such as cambering and vulcanising. The segments of the central drum are then drawn inwardly again to facilitate withdrawal of the tyre.

The present invention relates to the displacing mechanism of the building-up drum to be described. On the part 17 of the shaft 3 which is of reduced diameter, a sleeve 19 is secured by a key 18 to rotate therewith. Plates 20, 20′ are secured on the extremities of the sleeve 19 by screws 21 and locating pegs 22. The plates 20, 20′ have radial guides 23 in which slide guide elements 24. The central parts 6 of the drum segments 4 are secured on the guide elements 24 and these segments 4 are thus held fast in the peripheral direction relative to the shaft 3, but can be displaced radially relative to the shaft. The plates 20 have other guides, not visible in FIG. 2, which also extend radially and guide the wedging bars 5 (FIGS. 3 and 4).

Bearing rings 25 are disposed on the sleeve 19, on which a sleeve 26 is mounted as a running fit. The sleeve 26 has integral with it setting rings 27, 27′. Shackles 28 and 29 are hingedly connected to these setting rings by bolts 30, 31 respectively, the shackles 28 and the bearing bolts 30 only being shown in FIG. 1. The shackles 29 and their bearing bolts 31 are visible only in FIGS. 3 and 4. The outer extremities of the shackles 28 are articulated to the segments 4, i.e. to their central parts 6, by bolts 32, whereas the outer extremities of the shackles 29 are articulated to the wedging bars 5 (FIGS. 3 and 4). As seen in FIGS. 3 and 4, the distance of the bolts 31 from the axis of the drum (radius $R_k$) is greater than the distance of the bolts 30 from the axis of the drum (radius $R_s$). The bolts, i.e. the outer bolts 32 and 33, are situated on approximately the same radius in the extended position. The shackles 29 are thus shorter (length $L_k$) than the shackles 28 (length $L_s$).

A setting sleeve 34 round the shaft 3 causes the sleeve 26 and the setting rings 27, 27′ secured thereto to rotate. This setting sleeve may be rotated by its left-hand extremity in FIG. 1 and through a lug 35 thereon entrains the sleeve 26. The lug 35 traverses an arc-shaped slot 36 in the plate 20. The extremities of this slot simultaneously form the terminal stops for the rotation of the sleeve 26 and rings 27.

FIG. 4 shows the fully retracted position of the wedging bars 5 and segments 4. In this position, the shackles subtend an angle $\alpha_k$ and $\alpha_s$ with the radial direction indicated by the dash-dotted lines 37 and 38 respectively.

The angle $\alpha_k$ is greater in the idle position than the angle $\alpha_s$. The shackles 28 have cutouts 39 to allow minimum inward displacement whilst leaving sufficient strength in the shackles. For outward pivoting, the setting sleeve 34 is turned and entrains the sleeve 26 by the lug 35. This turns the setting rings 27, 27′ and brings the shackles into the position shown in FIG. 3. This position is reached because the segments 4 and the wedging bars 5 are guided by the radial guide slots 23 and cannot therefore move peripherally of the drum, so that a radial displacement must occur mandatorily. In the final position, the tapering faces 40 of the wedging bars 5 bear on the mating surfaces 41 of the segments 4. This contact of the tapered surfaces 40 on the mating surfaces 41 occurs only when the segments 4 have reached their extreme position. Friction between the tapered surfaces 40 and the mating surfaces 41 is thus impossible. In the fully extended position, the shackles extend in approximately radial directions and thus act as toggle levers, i.e. great radial forces may be exerted in the final position with slight turning forces on the setting rings. The extended position of the segments may accordingly be maintained by low holding forces on the sleeve 26.

In a modified construction functioning in a similar way to that shown in the drawings, a displacing sleeve is provided, with the shackles pivoted in planes parallel to the axis of the drum. Angle levers or cranked levers, whose inner extremities slide along control surfaces, for example, may be employed instead of the shackles referred to herein as links.

I claim:

1. A tyre building-up drum comprising a number of radially displaceable segments having circumferentially inclined surfaces, a number of radially displaceable wedge-shaped bars having circumferentially inclined surfaces complementary to said segment inclined surfaces and engaging therewith in the radially outwardly extended positions thereof, said segment and wedge-shaped bars being guided only in the radial direction, a setting element displaceable relatively to said segments, and a plurality of links each articulated by one end portion to one of said segments and bars and at its other end portion articulated to said setting element, the effective length of said bar links being shorter than that of said segment links when in a substantially radial position and operable so that movement of said links will cause said segments to move radially outwardly before said bars and inwardly after said bars.

2. A tyre building-up drum comprising a number of radially displaceable segments having circumferentially inclined surfaces, a number of radially displaceable wedge-shaped bars having circumferentially inclined surfaces complementary to said segment inclined surfaces and engaging therewith in the radially outwardly extended positions thereof, a setting element displaceable relatively to said segments, a plurality of links each articulated by one end portion to one of said segments and bars and at its other end portion articulated to said setting element, the effective length of said bar links being shorter than that of said segment links when in a substantially radial position and operable so that movement of said links will cause said segments to move radially outwardly before said bars and inwardly after said bars, a shaft on which the drum is mounted, a sleeve mounted on said shaft secured to said setting element, and said links being disposed at right angles to the longitudinal axis of said drum and shaft.

3. A tyre building-up drum comprising a number of radially displaceable segments having circumferentially inclined surfaces, a number of radially displaceable wedge-shaped bars having circumferentially inclined surfaces complementary to said segment inclined surfaces and engaging therewith in the radially outwardly extending positions thereof, a setting element displaceable relatively to said segments, a plurality of links each articulated by one end portion to one of said segments and bars and at its other end portion articulated to said setting element, the effective length of said bar links being shorter than that of said segment links when in a substantially radial position and operable so that movement of said links will cause said segments to move radially outwardly before said bars and inwardly after said bars, a shaft on which said drum is mounted, a sleeve mounted on said shaft and secured to said setting element, said setting element comprising two rigidly interconnected rings, and said links being disposed at right angles to the longitudinal axis of said drum and shaft.

References Cited by the Examiner

UNITED STATES PATENTS

| | | | |
|---|---|---|---|
| 1,877,746 | 9/1932 | Heston et al. | 156—420 |
| 2,020,497 | 11/1935 | Bostwick | 156—420 X |
| 2,043,937 | 6/1936 | Templeton | 156—420 |
| 3,038,526 | 6/1962 | Brey | 156—420 |
| 3,077,918 | 2/1963 | Noall | 156—420 |

FOREIGN PATENTS 636,487  2/1962  Canada.

EARL M. BERGERT, *Primary Examiner.*

HAROLD ANSHER, *Examiner.*